Figure 1:
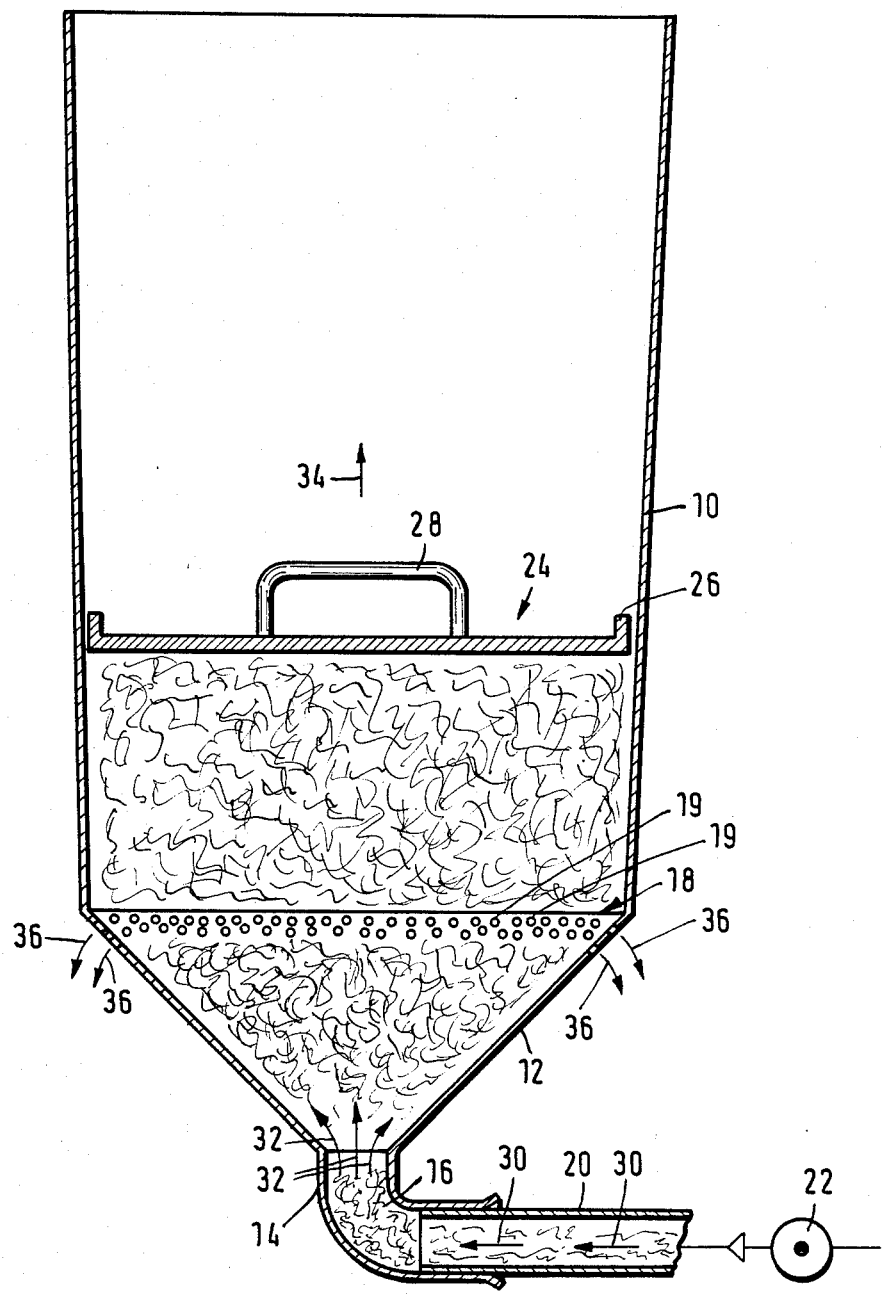

United States Patent [19]

Simson

[11] Patent Number: 4,532,860
[45] Date of Patent: Aug. 6, 1985

[54] APPARATUS FOR COLLECTING WASTE FROM A TEXTILE MACHINE

[75] Inventor: Dionizy Simson, Winterthur, Switzerland

[73] Assignee: Sulzer Brothers Limited, Winterthur, Switzerland

[21] Appl. No.: 571,688

[22] Filed: Jan. 18, 1984

[30] Foreign Application Priority Data

Jan. 21, 1983 [EP] European Pat. Off. ....... 83 810024.6

[51] Int. Cl.$^3$ .............................................. B30B 9/00
[52] U.S. Cl. ...................................... 100/90; 53/527; 100/215; 100/251; 100/265; 100/295; 141/374; 406/175
[58] Field of Search .................... 100/90, 91, 215, 245, 100/251, 265, 295, 104, 116, 65–69; 53/436, 439, 527; 57/304; 406/171, 174, 175; 141/73, 12, 374; 55/475

[56] References Cited

U.S. PATENT DOCUMENTS

| 2,488,395 | 11/1949 | Goldberg | 100/90 X |
| 3,555,997 | 1/1971 | Van der Lely | 100/66 X |
| 3,601,955 | 8/1971 | Ferri | 100/90 X |
| 4,019,984 | 4/1977 | Mohn | 100/116 X |
| 4,180,390 | 12/1979 | Furstenberg | 19/107 X |

OTHER PUBLICATIONS

Western Electric Tech-Digest No. 31, Jul. 1973, D. I. Marshall.

Primary Examiner—Billy J. Wilhite
Attorney, Agent, or Firm—Kenyon & Kenyon

[57] ABSTRACT

The waste collecting apparatus includes a container with a movable wall which rises during accumulation of waste within a container and which compacts the waste within the container. Outlets for the exhaust of the carrier medium are provided in the stationary wall of the container in one embodiment or in the movable wall in a second embodiment. Compressed air may also be delivered to the container in a pulsed manner so as to impart a tamping action to the movable wall during a filling operation.

10 Claims, 2 Drawing Figures

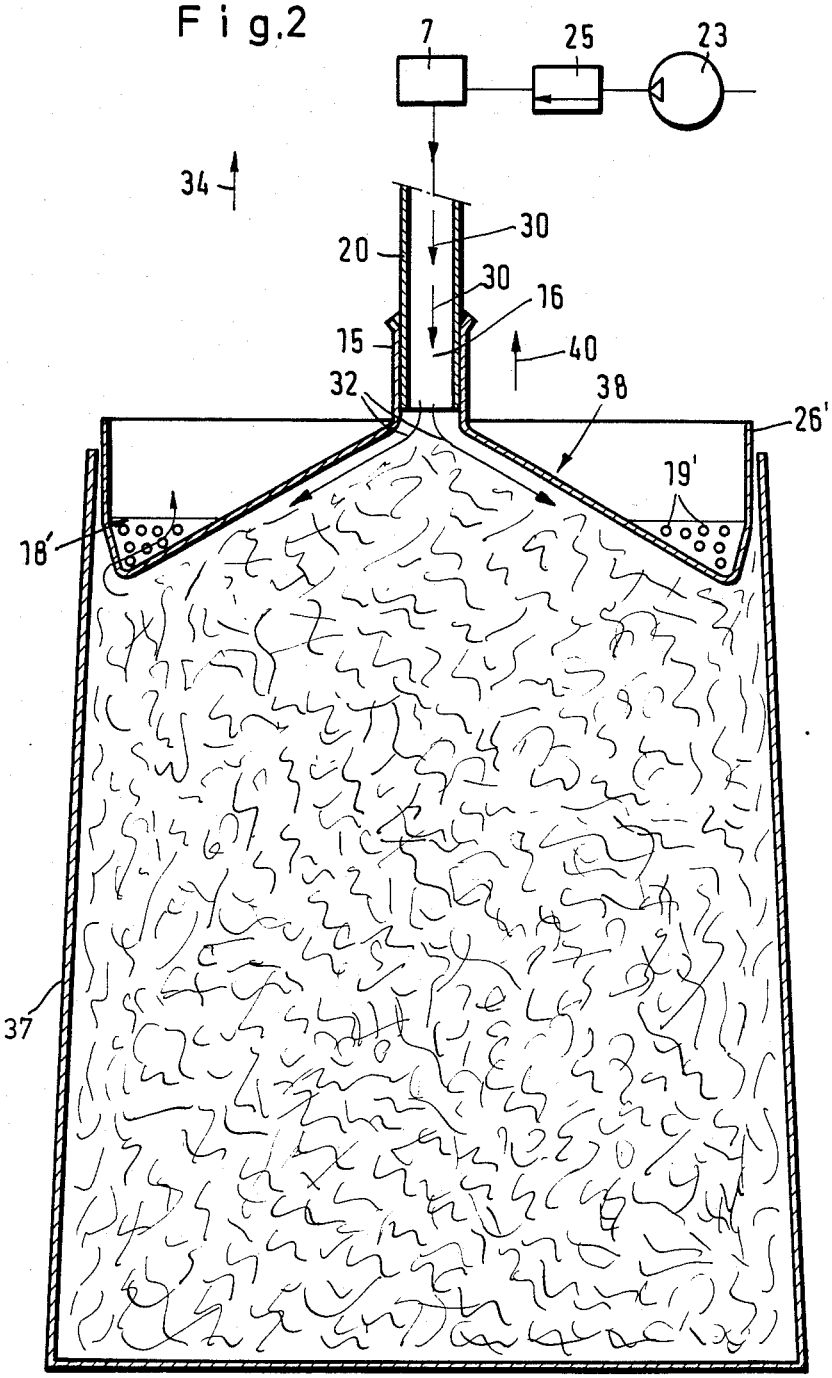

APPARATUS FOR COLLECTING WASTE FROM A TEXTILE MACHINE

This invention relates to an apparatus for collecting waste from a textile machine.

Heretofore, various types of devices and machines have been known for collecting waste from textile machines. For example, U.S. Pat. No. 4,180,390 describes a textile machine which has an air transport and cleaning means wherein air containing the textile waste is fed by a fan into a chamber containing a conveyor screw which extends over a base in the form of a screen. During operation, the machine is intended to separate the coarser particles of waste for compression by the conveyor screw while air is delivered to a second chamber having a dust bag for additional cleaning. However, such a device has various disadvantages. For example, the device is relatively complex in construction. Second, an additional motor drive is required for the compression operation carried out by the conveyor screw.

Accordingly, it is an object of the invention to provide an apparatus for collecting waste from a textile machine which is of relatively simple construction.

It is another object of the invention to provide an apparatus for collecting and compressing waste from the textile machine without the need for mechanical drive elements for the compression operation.

It is another object of the invention to permit the accumulation and compression of waste from a textile machine in a relatively simple and economical manner.

Briefly, the invention provides an apparatus for collecting waste from a textile machine which comprises a container, a first means which defines an inlet to the container in order to deliver a flow of waste-laden carrier medium into the container and a second means defining an outlet from the container in order to exhaust carrier medium from the container while retaining waste within the container. In addition, the apparatus includes at least one movable wall in the container for compressing waste which is retained in the container.

The apparatus is such that the movable container wall is moved directly by the waste-carrier medium. As a result, the volume of the waste material is limited. Further, there is no need for any additional compression system.

The apparatus may be constructed so that the movable container wall is disposed for movement under gravity. In this way, the container wall floats as if on a body of liquid defined by the waste material with the weight of the container wall providing for some compression of the waste.

The apparatus may also be provided with a means for pulsating a supply of carrier medium through the means defining the inlet. This permits a vibration to be imparted to the movable container wall so that additional compression or compaction of the waste is obtained with a corresponding increase in container capacity.

The means defining an outlet may be in the form of a screen so that waste can be separated from the carrier medium with minimum flow resistance.

The movable container wall may also be of conical shape with the means defining the inlet and the means defining the outlet disposed therein. This provides an advantage in that the container itself may be in the form of a simple cylindrical drum. In this case, when filled, the container can be removed and replaced by an empty container. Further, the container may widen in a direction away from the means defining the inlet, that is, in the direction of movement of the movable container wall. This will avoid jamming of the moving wall and will also facilitate emptying of the container. Still further, the movable container wall may be provided with a guide for guiding the wall within the container so as to prevent skewing or jamming.

In one embodiment, the container has a conical bottom with the means defining the inlet and the means defining the outlet disposed therein. This permits an optimum uniformity of distribution of the waste over the container cross-section.

These and other objects and advantages of the invention will become more apparent from the following detailed description taken in conjunction with the accompanying drawings wherein:

FIG. 1 illustrates a cross-section view through a first embodiment of a waste collecting apparatus in accordance with the invention; and FIG. 2 illustrates a cross-sectional view of a second embodiment of a waste collecting apparatus in accordance with the invention.

Referring to FIG. 1, the apparatus for collecting waste from a textile machine includes a vertically disposed container 10 of substantially cylindrical cross-section which widens out conically at a slight angle in the upward direction, as viewed. In addition, the container 10 has a conical bottom 12.

A first means defining an inlet 14 to the container 10 is disposed at the lower end of the bottom 12 and is in the form of a bent tube. As indicated, the inlet 14 communicates with a pipe 20, which in turn, is connected to a suction extraction fan 22 (ISO 1219-1976) which may, for example, be associated with the catcher side of an air jet or projectile weaving machine. The fan 22 serves to deliver a flow of waste-laden carrier medium through the pipe 20 and inlet 14 into the bottom 12 of the container 10. In this example, the carrier medium is air while the waste is indicated at 16.

A means defining an outlet is also provided in the bottom 12 to exhaust carrier medium from the container 10 while retaining the waste 16 within the container 10. As indicated, this means is in the form of a peripherally extending screen 18 formed with apertures 19 through which the carrier medium is able to exhaust as indicated by the arrows 36.

A movable wall in the form of a cover 24 is also provided in the container 10 for compressing the waste 16 retained in the container. As indicated, the cover 24 is of flat annular shape and has a guide 26 in the form of an annular flanged edge for guiding the cover 24 within the interior of the container 10. In addition, a handle 28 is provided on the upper most side of the cover 24 to permit manual manipulation of the cover 24, for example to provide access to the interior of the container 10.

In operation, waste 16, for example weft yarn waste or cuttings from an air jet or projectile weaving machine, is introduced by the fan via the pipe 20 and inlet 14 as indicated by the arrows 30 and is distributed over the cross-section of the container 10 as indicated by the arrows 32. During this time, the cover 24 moves up in the direction indicated by the arrow 34 as the contents of the container 10 rise. At the same time, the air which is used as the carrier medium escapes through the apertures 19 in the screen 18 in the direction indicated by the arrows 36. In addition, the retained waste 16 is compressed into a compact mass by the weight of the movable cover 24.

Referring to FIG. 2 wherein like reference characters indicate like parts as above, the apparatus may be used to fill a container 37 from above. As indicated, the container 37 is vertically disposed and has a slightly conical shape. In addition, a movable container wall 38 which is of conical shape with a flanged guide 26 is provided within the container 37. Further, an inlet 15 is provided centrally in the wall 38 in order to permit the delivery of the waste-laden carrier medium into the container 37. As indicated, a pipe 20 is secured within the inlet 15 in order to deliver the waste-laden carrier medium. Further, the pipe 20 leads to a weaving machine 7 and is flexible in order to accommodate vertical movements of the movable wall 38.

The movable wall 38 also has a means defining an outlet for the exhaustion of the carrier medium from the container 37. As above, this means is in the form of a screen 18' which has apertures 19' through which the carrier medium may exhaust. Further, the screen 18' extends over the periphery of the cone of the wall 38.

During operation, the waste-laden carrier medium is directed through the tube 20 and inlet 15 in the direction indicated by the arrows 30 and is distributed over the cross-section of the container 37 as indicated by the arrows 32. As the waste accumulates within the container 37, the wall 38 lifts upwardly in the direction indicated by the arrow 34 while compacting the waste.

The waste collecting apparatus may also be provided with a means for pulsating a supply of carrier medium through the inlet means. For example, as shown in FIG. 2, a compressor 23 for supplying air and a valve 25 are connected to the weaving machine 7 and also to the pipe 20 in order to deliver pulses of air. For example, the valve 25 is normally provided with an on/off system which can be used to give the container wall 38 a vibration in the direction indicated by the double arrow 40. This, in turn, permits an additional tamping action to be imparted to the wall 38 to assist the compaction of the waste within the container 37.

Of note, the movable container wall may also be disposed for movement in a horizontal direction, for example against the bias of a spring. Further, the container may have ether cross-sections, for example an angular cross-section.

The means for supplying a pulsating supply of carrier medium can also be used in the embodiment of FIG. 1.

The invention thus provides a waste collecting apparatus which is of relatively simple construction. Further, the movable wall of the apparatus does not require a separate drive mechanism but instead is able to operate under gravity. This further simplifies the construction of the apparatus.

The invention further provides an apparatus which can be readily cleaned from time to time, for example by removing the movable cover in order to gain access to the interior of the container.

What is claimed is:

1. An apparatus for collecting waste from a textile machine, said apparatus comprising
    a container;
    first means defining an inlet to said container to deliver a flow of waste-laden carrier medium into said container;
    at least one movable wall in said container for compressing waste therein; and
    second means in said movable wall defining an outlet from said container to exhaust carrier medium from said container while retaining waste within said container.

2. An apparatus as set forth in claim 1 wherein said movable wall is disposed for movement under gravity.

3. An apparatus as set forth in claim 1 wherein said movable wall has a conical shape and said first means is disposed in said wall.

4. An apparatus as set forth in claim 1 wherein said movable wall has a guide for guiding said wall within said container.

5. An apparatus as set forth in claim 1 wherein said second means is a screen.

6. An apparatus as set forth in claim 1 wherein said container widens in a direction away from said inlet.

7. An apparatus for collecting waste from a textile machine, said apparatus comprising
    a vertically disposed container;
    a movable wall in said container for compressing waste retained in said container;
    an inlet in said wall to deliver a flow of waste-laden carrier medium into said container and;
    means defining an outlet in said wall to exhaust carrier medium from said container while retaining waste within said container.

8. An apparatus as set forth in claim 7 wherein said wall is of conical shape.

9. An apparatus as set forth in claim 7 which further comprises a pipe secured to said inlet to deliver waste-laden carrier medium thereto, said pipe being flexible to accommodate vertical movements of said wall.

10. An apparatus for collecting waste from a textile machine, said apparatus comprising
    a container;
    first means defining an inlet to said container to deliver a flow of waste-laden carrier medium into said container;
    second means defining an outlet from said container to exhaust carrier medium from said container while retaining waste within said container;
    at least one movable wall in said container for compressing waste retained in said container; and
    a means for pulsating a supply of carrier medium through said first means.

* * * * *

UNITED STATES PATENT AND TRADEMARK OFFICE
CERTIFICATE OF CORRECTION

PATENT NO. : 4,532,860
DATED : August 6, 1985
INVENTOR(S) : Dionizy Simson

It is certified that error appears in the above-identified patent and that said Letters Patent is hereby corrected as shown below:

Column 3, line 6 change "guide 26" to --guide 26'--

Column 3, line 45 change "ether" to --other--

Signed and Sealed this

Seventh Day of January 1986

[SEAL]

Attest:

Attesting Officer

DONALD J. QUIGG

Commissioner of Patents and Trademarks